June 27, 1944.  R. LANG ET AL  2,352,212
POWER AND SPEED TRANSMISSION FOR MOTOR VEHICLES
Filed April 5, 1940  2 Sheets-Sheet 1
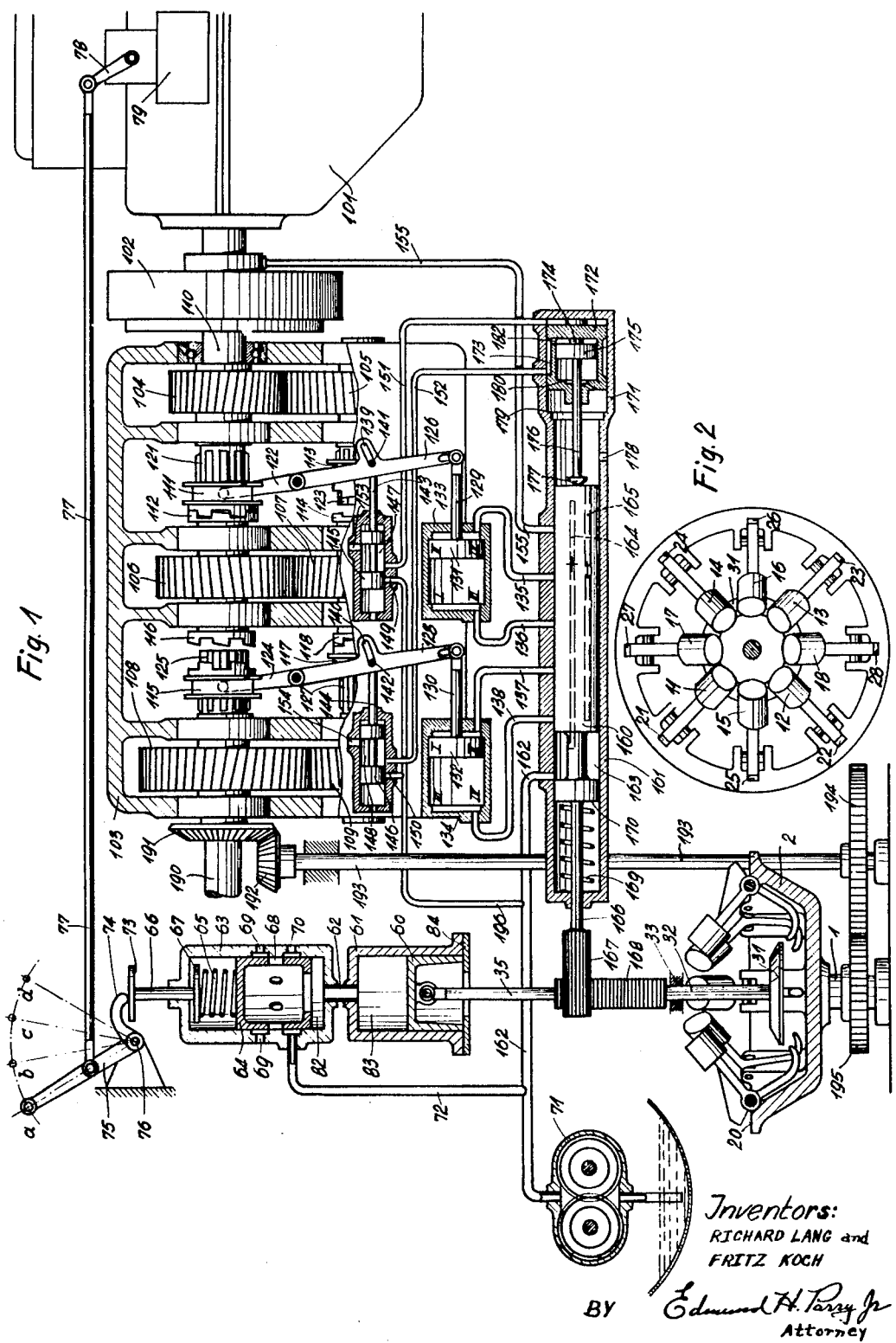
Inventors:
RICHARD LANG and
FRITZ KOCH
BY Edmund H. Parry Jr.
Attorney June 27, 1944. R. LANG ET AL 2,352,212
POWER AND SPEED TRANSMISSION FOR MOTOR VEHICLES
Filed April 5, 1940 2 Sheets-Sheet 2

Inventors:
RICHARD LANG and
FRITZ KOCH
BY Edmund H Parry Jr
Attorney

Patented June 27, 1944

2,352,212

UNITED STATES PATENT OFFICE 2,352,212

POWER AND SPEED TRANSMISSION FOR MOTOR VEHICLES

Richard Lang, Ravensburg, and Fritz Koch, Friedrichshafen, Bodensee, Germany; vested in the Alien Property Custodian Application April 5, 1940, Serial No. 328,132
In Germany March 13, 1939

7 Claims. (Cl. 74—336.5)

Our invention relates to power and speed transmissions for motor vehicles and has special reference to transmissions of this kind which include a change speed gear with an automatically operated device for causing speed changes.

The main object of our invention is to provide a device which is of special advantage with transmissions having a plurality of different speeds as for instance in connection with motor vehicles running on rails. Our device is comparatively simple in construction and yet it affords not much space and can easily be controlled.

According to our invention we provide an automatically operated device for causing speed changes and manually operated means for influencing such automatic device. The automatic device includes a main operating member, for instance a multiple valve or the like adapted to control fluid pressure conduits leading to the clutches to be operated in the change speed gear, and preferably also to the main clutch situated between the motor and the change speed gear. Consequently, by means of this single main member all the operations necessary for the speed changes are controlled. For the purpose of causing automatic operation in dependence on the vehicle speed, we provide a centrifugal governor rotated in dependence on this speed which acts on the main control or operating member causing this to operate also in dependence on the said speed. When speaking of fluid pressure we understand pressure exerted by means of a gas as well as by means of a liquid.

The action of such governor may again be influenced manually for example by means of a springloaded valve counteracting to the effect of the governor, the tension of the spring being varied by means of a hand or foot lever, which again at the same time may be in direct or indirect operative connection with a control means for the fuel admission to the motor. For such fuel admission a carburetor may be provided or a fuel pump, as with Diesel engines.

When causing speed changes in the change speed gear elements therein have to be shifted, for example clutch members. Such shifting has to be perfected in certain relation to the position of other elements, for instance of the main clutch members and vice versa. That is why we provide means for influencing the afore-mentioned main operating member in dependence on the position of certain elements in the change speed gear or on the position of the main clutch members.

All this will be understood best when having reference to the drawings which represent an example embodying our invention.

Fig. 1 is a diagrammatical vertical section through a transmission arrangement.

Fig. 2 is a plan view on the governor.

Figures 3, 4:
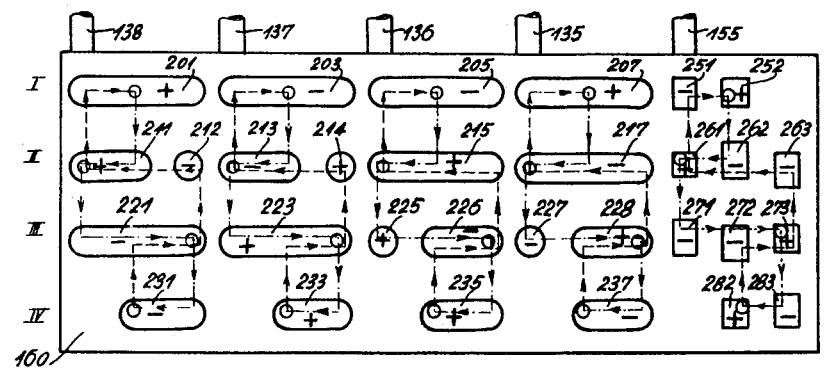
Fig. 3 shows the circumference of the main operating member wound off in one plane, but on a larger scale.
Fig. 4 is a vertical section through another modification of such main operating member, also on an enlarged scale.

In Fig. 1 there is shaft 1 driving a centrifugal governor, the support 2 of which is provided with 8 single weights as shown in Fig. 2.

The pendulums are marked 11—18. They have extensions or brackets 21—28 of different height which prevent the weights from further outward movement, when they have come to bear against the surface 20 of the support 2. The weights 11, 12, 13, 14 have the smallest stroke, the weights 15, 16 about the double, and the weights 17 and 18 the triple stroke of the weights 11 to 14.

31 is a disc connected to the end of a rod 32/35 which is guided in a bearing 33 and shaped into a toothed bar at 168. The upper end of rod 32/35 is journaled in a piston 60 slidable in a cylinder 61. There is a connecting conduit 62 opening into casing 63 in which a control slide valve 64 is situated, loaded by a spring 65 which, at its other end, bears against disc 67 connected to rod 66. The slide valve 64 is provided with control ports 68. Casing 63 has outlet ports 69 as well as an annular channel 70 into which opens a conduit 72 extending from an oil pump 71 driven by the engine 101. The upper end of rod 66 is provided with a disc 73 bearing against the finger end 74 of double lever 74/75 journaled at 76. Said lever is connected to another lever 78 by means of rod 77. Lever 78 serves for regulating the fuel pump or carburetor 79. There are different positions of lever 75 marked a, b, c and d.

The driving engine of the motor vehicle is partly shown at 101. Friction clutch 102 connects to the change speed gear mounted in casing 103. There are three pairs of gears in this gear box, namely 104/105, 106/107 and 108/109. The various speeds are changed by means of two double acting clutches 111/112, 113/114 and 115/116, 117/118. Clutch halves 111, 113, 115 and 117 are slidably splined to their respective shaft portions 121, 123, 125 and 127. Clutch halves 111 and 113 and clutch halves 115 and 117 are engaged and disengaged alternately by means of double levers 122 and 124, respectively. Levers 122 and 124 are provided with extensions 126 and 128, respectively, to the ends of which piston rods 129 and 130 are connected with pistons 131 and 132, respectively. These pistons are adapted to slide in cylinders 133 and 134 to which pressure oil conduits 135, 136, 137, 138 are connected.

Furthermore, levers 126 and 128 are provided with slits 139 and 140, respectively, wherein pins 141 and 142 are adapted to slide. These pins are formed on the ends of rods 143 and 144, respectively, to the other ends of which control members 145 and 146, respectively, are connected. The latter each have an annular groove 147 and 148, respectively, forming a kind of valve sliding in surrounding cylinders to which pressure oil conduits 149, 150, 151 and 152 are connected. The respective outlet ports are designated at 153 and 154.

Friction clutch 102 is also brought into engagement by pressure oil conducted thereto by means of conduit 155.

160 is a control slide valve adapted to be rotated and to be displaced longitudinally inside of casing 161. Connected to casing 161 are conduits 135, 136, 137, 138, 155 as well as the main feeding conduit 162 coming from the oil pump 71. Another branch 196 of conduit 162 connects to conduits 149 and 150, leading to control members 145 and 146, respectively. Slide valve 160 has an annular groove 163 and also two longitudinal bores 164 and 165, the first one opening at the left hand end, the other at the right hand end of member 160. At the left hand end of slide valve 160 there is an extension 166 to the end of which a pinion 167 is connected meshing with toothed bar 168. Between the left end of casing 161 and the left hand end face 170 of member 160 a pressure spring 169 is provided tending to push member 160 to the right.

To the right hand end of casing 161 a cylinder 171 is mounted in which a second cylinder adapted to be displaced longitudinally is located. The latter has an annular groove 173 and also a stop 174. In cylinder 172 a piston 175 is sliding which is connected to a rod 176, having an end button 177 which bears against the slide valve 160. There is an outlet port 178. 179 and 180 are annular faces in the cylinders 171 and 172, respectively. Port 182 connects from space 173 to the inside of cylinder 172. To cylinder 171 are connected the two conduits 151 and 152.

The driven shaft 190 leaves the change speed gear at its left hand end. On this shaft which drives the vehicle a bevelled gear 191 is fixed which engages with a bevelled gear 192 fixed to shaft 193 by means of which shaft 1 is rotated over pinions 194, 195.

Between the longitudinal bores 164 and 165 in the slide valve 160 and its circumference suitable connecting channels extending radially or substantially radially are provided which are not shown in Fig. 1, for simplicity's sake. In order to explain the control travels the circumference of the slide valve 160 is unrolled in Fig. 3 and shown on a somewhat enlarged scale.

As will be seen from this figure the circumference of the slide valve 160 is provided with four longitudinal rows of channels. Row I comprises channels 201, 203, 205, 207 as well as 251 and 252. This row is adapted to be used for setting the first speed. Row II comprises channels 211, 212, 213, 214, 215, 217 and 261, 262, 263. This row is adapted to be used for setting the second speed. Row III comprises channels 221, 223, 225, 226, 227, 228 and 271, 272, 273. This row is adapted to be used for setting the third speed. And row IV comprises channels 231, 233, 235, 237 and 282, 283. This row is adapted to be used for setting the fourth speed of the change speed gear. The "+" sign in the various channels indicates connection to the pressure oil feeding bore 164, whereas the "−" sign indicates connection to the outlet bore 165 through which the oil pressure is reduced.

The following table shows for each individual speed which dog clutches are engaged in the change speed gear and which conduits have to be connected to the feeding pressure oil conduit and to the outlet. Furthermore, the channels are indicated which have to be connected with the feeding bore 164 or with the outlet bore 165 for the purpose of causing engagement or disengagement of the friction clutch 102. The neutral position indicated in the fourth vertical column of the table is infrequently used, because as soon as one change clutch is disengaged, the other one is immediately engaged.

|  | I | II | Neutral position | III | IV |
|---|---|---|---|---|---|
| Transmitting gears | 104, 105<br>109, 108 | 106, 107<br>109, 108 |  | 104, 105<br>107, 106 | Direct. |
| Gear clutches engaged | 113, 114<br>117, 118 | 111, 112<br>117, 118 | 111, 112<br>115, 116 | 113, 114<br>115, 116 | 111 112<br>115, 116 |
| Conduits to the cylinders of the gear clutches |  |  |  |  |  |
| Connected with the feeding oil conduit | 135, 138 | 136, 138 | 136, 137 | 135, 137 | 136, 137 |
| Connected with outlet | 136, 137 | 135, 137 | 135, 138 | 136, 138 | 135, 138 |
| Ports connected with conduit 155 leading to the main friction clutch | 252(+) | 261(+) | 272(−) | 273(+) | 282(+) |

The operation of the control device represented in Figs. 1 to 3 is as follows:

Shaft 1 of the centrifugal governor is driven in dependence on the vehicle speed by shaft 190, as shown. As long as shaft 1 does not rotate all the weights are in their lowest position, as represented in Fig. 1, wherein the fingers of all of the weights are out of touch with disc 31. In this position, the piston 60 bears against the end plate 84. This corresponds to the initial position of the entire device when at rest or at slow speed of the centrifugal governor, i. e. at low speed of the vehicle, the control slide valve 160 being in the first speed position which will be described in a later passage.

When starting the engine, the weights come into the position in which the fingers of all of them bear against the disc 31. The disc 31, however, remains at first in the position shown in Fig. 1.

Assuming first, the operating lever 75 be in the position a, indicated in Fig. 1 which corresponds to the first operating step (engine speed, performance, and car speed step). As the operating lever 75 is connected to the fuel pump or carburetor 79 of the driving engine, this member is set at the same time. No pressure is exerted by means of members 75, 74, 66 on spring 65, so that this presses on the slide valve 64 with its lowest pressure. As long as no oil was fed, the slide valve 64 was in its lowest position in which there is free access from the groove 70 through the ports 68 into the space 82 below the slide valve 64.

As soon as the engine starts and the oil begins to flow, oil is supplied into the space 82 and by means of conduit 62 at the same time also into the space 83 of cylinder 61. Consequently, slide valve 64 is pressed upwards until the oil pressure in space 82 keeps the balance to the force exerted by spring 65. If the oil pressure rises beyond the slide valve 64 is moved upwards higher than its middle position represented in the figure, permitting escape of oil through the ports 68 and the outlet orifices 69. Owing to the thus caused reduction in pressure in space 82, the slide valve 64 is immediately led back into its middle position. If the oil pressure drops below the value determined by the spring compression, the slide valve 64 is slightly pressed downwards, permitting thus admission of oil from conduit 72 into space 82 through the annular groove 70 and the ports 68. Consequently, the pressure in the space 82 below slide valve 64 increases and causes it to move back into its middle position. According to the pressure set by the control slide valve 64, the piston 60, too, is always loaded by the pressure oil embodied in the space 83.

Not before a certain number of revolutions is reached the centrifugal force of the weights 11 to 18 is sufficient to overcome the oil pressure existing in the space 83. With this number of revolutions i. e. with an adequate speed of the vehicle, all weights deflect. Thereby the disc 31 and the toothed bar 168 are moved upwards and the pinion 167 together with the slide valve 160 are rotated to such extent that the latter moves from the first speed position into the second speed position. The control sections effective in these two speeds are indicated in detail in another passage of this specification.

By the upward displacement of the rods 32 and 35 the piston 60 is also displaced within cylinder 61 in the upward direction, which causes the slide valve 64 to be lifted also a little so as to permit of the outflow of oil through the ports 68 and the outlet orifices 69 to such an amount that in the new position there exists again equilibrium between the centrifugal force of the weights and the oil pressure in the spaces 82 and 83. In this position the stops 21, 22, 23, 24 of the four weights 11, 12, 13, 14 will have come to bear against the face 20 of the support 2. With the number of revolutions now prevailing any further movement of the disc 31 and the parts in connection with it by the remaining four weights 15–18 still capable of deflecting is impossible because the centrifugal force of the four weights 15–18 is not sufficient to overcome the reaction of the oil pressure.

Supposing the velocity of the vehicle be further increased: At a certain number of revolutions of shaft 1 the centrifugal force of the four weights 15, 16, 17, 18 is so great that upward movement of disc 31 causes further rotation of the rotary slide valve 160 into the next position (third speed) and also upward movement of piston 60. The resistance acting against the force transmitted by the four centrifugal weights to the disc 31 is again the oil pressure existing in the spaces 83 and 82 which corresponds to the force transmitted by the spring 65 to the slide valve 64. The resistance acting against these four centrifugal weights is thus the same as the resistance acting before against all 8 centrifugal weights. But, not taking into consideration the friction of the slide valve 160 and assuming the same dimensions for all weights, the number of revolutions has risen to the double of the number of revolutions with which the eight weights began to move. In the position now occupied by the weights 11, 12, 13, 14 the weights 15, 16 with their extensions, too, bear against the face 20.

If the number of revolutions increases further to about the double amount of $n$, the two centrifugal weights 17, 18 finally begin again to move and come also to stop at the face 20 with their extensions 27 and 28. Now, all eight weights are in their end positions. Thereby the slide valve has been rotated so far that the fourth speed is engaged.

If the control is to be effected in another operating step, the operating lever 75 is taken from the position represented in Figure 1 which corresponds to step $a$ into one of the other operating steps ($b$, $c$ or $d$). Thereby spring 65 is put under higher tension by means of the rods 75, 74, 66 and, consequently, slide valve 64 is moved a little more downward causing connection by means of the ports 68 between the circular groove 70 and the space 82, so that a higher oil pressure is created therein. Slide valve 64 will immediately return to its middle position, as explained above. Due to the increased oil pressure now existing in the spaces 82, 83 a greater force is set against the centrifugal weights. Therefore, a higher centrifugal force of the governor weights is wanted for causing their deflection and the change to the next position (gear change) which means that a higher speed of rotation of shaft 1 and consequently a higher car velocity is necessary therefor. The change-over from one of the afore-mentioned operating steps to the next one by means of the rotary slide valve 160 is thus effected at a number of revolutions corresponding to the higher oil pressure.

Whereas in the case exemplified the change-over during operation in an upper operating step takes place at a higher number of revolutions than in a lower operating step, the arrangement may as well be made to operate in the reverse sense, so that when engaging an upper operating step, the change-over will take place at a lower number of revolutions than in a lower operating step. This has to be decided in accordance with the prevailing acquirements of operation.

Of course, the change up or down to another operating step is possible at any moment, irrespective of the position of the control device.

In Fig. 1 the change speed gearing is represented in the second speed. The numbers I, II, III, IV indicated in the cylinders 133 and 134 mark the positions of the pistons 131 and 132, respectively, in the corresponding speeds.

In the first speed, as may be seen from the table, the conduits 135 and 138 are connected to the pressure oil feeding conduit. Port 207 receives pressure oil from the bore 164 and delivers it into the conduit 135, whereas the port 201 supplies it into the conduit 138. Ports 203 and 205 and by them the conduits 137 and 136 are connected with the outlet bore 165. Consequently, piston 132 is in its right hand end position and piston 131 in its left hand end position; the change clutches 117, 118 and 113, 114 are engaged.

With the pistons 132, 131 in these positions the control valve 145 is in its left hand position and the control valve 146 in its right hand position. Conduit 151 is thus connected to the pressure oil feeding line 149 through the recess 147 while conduit 152 is connected with the outlet port 154 through recess 148. From the interior of the cylinder 172 the pressure oil is allowed to escape by the orifice 182 and the recess 173. The spring 169 forces the control slide valve 160 to the right and holds the piston 175 against the right hand inner cylinder bottom of cylinder 172 (by means of members 176, 177). But cylinder 172 remains in its left hand position inside of cylinder 171, because pressure oil is admitted by conduit 151. Consequently, the control slide valve 160 is in its middle position when the first speed is engaged, i. e. the orifice 252 which is in connection with the bore 164 supplying pressure oil coincides with the opening of conduit 155 and supplies through it pressure oil to the engaging and disengaging device of the friction clutch 102 so that the latter is engaged.

The travelling paths of the control slide valve 160 relative to the mouths of the conduits 135–138 and 155 when speeding up from first into second, third and fourth speed, are indicated in Fig. 3 in dash-dotted lines. The travelling paths of the control slide valve 160 when slowing down from the fourth into the third, second and first speeds are also indicated, but in dashed lines.

If now, by a device as represented in Figs. 1 and 2, the control slide valve 160 is rotated by the toothed bar 168 and the gear 167, whereby the rows of ports in the control slide valve 160 come to coincide one after the other with the openings of conduits 135, 136, 137, 138 and 155 in the casing 161 in accordance with the stepwise movement of the toothed bar 168. When changing to the second speed, after rotation of the slide valve 160 from position I into position II, the port 211 is connected with 138, 213 with 137, 215 with 136, 217 with 135 and 262 with 155. Pressure conditions in the conduits 138 and 137 remain the same as in the first speed so that there is no change in the respective situation of the clutch halves 115, 116 and 117, 118. The clutch 117, 118 remains engaged. In the conduits 135 and 136 the pressure conditions are reversed as compared to the first speed. Since conduit 155 is connected to the outlet through the orifice 262 and the channel 165, the oil pressure in the engaging device of the friction clutch 102 is released, the latter is disengaged. Pressure oil flows from the port 215 through the conduit 136 and arrives on the left hand side of the piston 131 while conduit 135 is released by the port 217. The piston 131 is thus moved to the right. The clutch halves 113 and 114 are disengaged, and clutch halve 111 is shifted to come in touch with clutch half 112. In the case exemplified overrunning clutches of a well-known type with inclined front faces of the claws are provided which, at first, will repulse each other. After the overrunning speed has been attained, the clutch 111, 112 engages. During the second half of the stroke of piston 131 to the right the control valve 145 is also displaced to the right so that conduit 151 is released by the recess 147 and the port 153. The pressure oil can now escape on the right hand of cylinder 172 from cylinder 171, and cylinder 172 together with the control slide valve 160 is moved into the right hand end position by means of spring 169. In this right end position pressure oil is supplied to the conduits 138 and 136 through the ports 211 and 215 whereas the port 261 has arrived in front of conduit 155 so that the latter is again fed with pressure oil, the main clutch 102 being engaged thereby. The second speed is set. This position is represented in Fig. 1.

When changing over from the second into the third speed after rotation of the slide valve 160 from position II into position III, pressure oil is supplied to conduit 137 through the port 223, while conduit 138 is released through port 221. Pressure conditions in conduits 136 and 135 at first remain the same because the pressure oil supply into conduit 136 through port 225 continues and conduit 135 remains released by the port 227. The conduit 155 is connected to the outlet by the orifice 271. This means disengagement of the friction clutch 102. The piston 132 is moved to the left, the clutch halves 117, 118 are disengaged and the clutch halves 115, 116 are engaged. At the same time the control valve 146 is moved to the left and pressure oil is supplied into the interior of the cylinder 172 from conduit 150 through the recess 148, the conduit 152, through the recess 173 and by the orifice 182, so that the piston 175 and consequently the control slide valve 160 are moved from their right hand end positions which they had in the second speed to the left into the middle position of member 160.

By the movement of the control slide valve 160 to the left the port 272 comes to coincide with the mouth of conduit 155, the latter remaining still connected to the outlet. Thus, the friction clutch 102 remains disengaged. Furthermore, the port 227 arrives in front of the mouth of conduit 135, and port 226 in front of the mouth of conduit 136. Pressure conditions in the conduits 136 and 135 are reversed and the piston 131 is shifted to the left, the clutch halves 113, 114 being engaged and the clutch halves 111, 112 disengaged. At the same time the control valve 145 is moved to the left so that pressure oil is supplied into the cylinder 171 from the conduit 149 through the recess 147 and the conduit 151. The cylinder 172 with piston 175 is shifted to the left against the tension of the spring 169, the control slide valve 160 being moved into its left hand end position. In this position of the slide valve 160 pressure oil flows again into the conduit 155 through the port 273. The clutch is engaged. The change-over into the third speed is established.

As compared with the other ports, the ports 262, 271 and 283 are a little enlarged in the direction of rotation of the slide valve 160 when speeding up, and the ports 251, 263, 272 in the direction of rotation of the slide valve when slowing down, in order to release the clutch 102 always a short time before the gear change is performed.

When changing over into the fourth speed the conduit 155 is released by the port 283 after rotation of the slide valve 160 from the position III into the position IV. The clutch 102 is disengaged. Pressure conditions in the conduits 137 and 138 remain the same as in the third speed, but in the conduits 135 and 136 they are reversed. The piston 131 is moved to the right. The clutch halves 113, 114 are disengaged and the clutch halves 111 and 112 are engaged. The control valve 145 moves to the right so that the conduit 151 is released through the recess 147 and the port 153. The cylinder 172 with the piston 175 moves to the right under the action of spring 169, the piston 175, however, in the cylinder 172 remaining in its left hand end position owing to the pressure of the oil supplied by the conduit 152, through the recess 173 and the port 182. The control slide valve is again in its middle position, pressure oil is supplied into the conduit 155 by the port 282 and the clutch is again engaged. The fourth speed is put in.

The slowing down from the fourth speed into the third, second and first speeds is performed in a similar manner as the speeding up described in the preceding passages. In the various speeds, the control slide valve 160 travels the path indicated by a dashed line in Fig. 3 in relation to the mouth of conduit 155.

Fig. 4 represents a further modification of the main control member. In this example it is a cam shaft 360 capable of being shifted and rotated in the casing 361. The elements designated by the numerals 366, 369, 376, 377 correspond to the elements 166, 169 and 176, 177 of Fig. 1, respectively, and the conduits 362, 338, 337, 336, 335 and 355 correspond to the conduits 162, 138, 137, 136, 135, 155 of Fig. 1, respectively.

Into the conduit 362 running alongside the casing 361 and serving for the supply of pressure means the valves 400, 410, 420, 430, 440 are inserted as control elements for the supply of auxiliary force to the shifting members of the change speed gear and of the main clutch. These valves each have two closing bodies 401, 402; 411, 412; 421, 422; 431, 432; 441, 442. The lower ends of the valves are provided with projections 403, 413, 423, 433, 443. There are springs 404, 414, 424, 434, 444 pressing the valves with their projections against the circumferential surface of the cam rod 360. 405, 415, 425, 435, 445 are air discharging ports. The cam rod 360 has for each control position a peculiar longitudinal profile and peculiar sections. It is rotated by the governor and displaced by the pistons 172 and 175 of Fig. 1 and thus brought into adequate positions for the various speeds, in the same manner as the main control slide valve 160 in Fig. 1.

In Fig. 4 the position of the cam shaft for the first speed is represented. The valves 400 and 430 are in their lower positions so that the conduits 338 and 355 receive pressure oil by the conduit 362. The valves 410, 420 and 440 are in their upper end positions so that the conduits 337, 336, 355, respectively, are released by means of ports 415, 425, 445, respectively. In the other speeds equal pressure conditions are prevailing in the various conduits as in the corresponding conduits of Figs. 1 and 3.

We do not want to be limited to the details described or shown in the drawings, as many variations will occur to those skilled in the art without deviating from the scope of our invention.

What we claim is:

1. In a power transmission device for motor vehicles, in combination: an internal combustion engine having a throttle, a driving shaft driven by said engine, a change speed gear, a driven shaft, a fluid pressure operated device for causing speed changes, a source of fluid under pressure connected with said device for causing speed changes, manually operated means for controlling said fluid pressure operated device in accordance with the positions of said throttle, said fluid pressure operated device comprising a main operating member, means for controlling said member operating in dependency on the vehicle speed, further control means for said same member operating in dependency on the position of certain elements performing the speed changes.

2. The structure defined in claim 1 wherein the change speed gear comprises a pair of clutches adapted to be shifted into and out of engagement alternately by said power operated device.

3. The structure defined in claim 1 wherein said main operating member comprises a substantially cylindrical control element adapted to be rotated stepwise and also to be shifted longitudinally.

4. The structure defined in claim 1 wherein said main operating member comprises a fluid pressure control element adapted to be rotated and also to be moved longitudinally, said element being provided with longitudinal bores, one for admitting fluid pressure and one for venting fluid pressure.

5. The structure defined in claim 1 wherein said manually operated means comprises a spring operated by a lever, and fluid pressure means connecting said spring to said main operating member, said fluid pressure means comprising a piston adapted to be moved in a cylinder in one direction by said spring and in the opposite direction by fluid pressure.

6. In a motor vehicle, an internal combustion engine, a change speed gear transmission driven by the engine, a shaft driven by the transmission, shift motor means selectively operative to shift said transmission, control means for the motor means, and actuating means for the control means comprising a fluid pressure chamber, adjustable means for controlling the fluid pressure in said chamber, said adjustable means also controlling the engine speed, means responsive to fluid pressure in said chamber to move the control means in one direction, and means responsive to the speed of the driven shaft to move the control means in the opposite direction only.

7. The structure defined in claim 1 further including fluid control valves, said operating member comprising a fluid pressure control element adapted to be rotated and to be moved longitudinally, said control element forming a cam shaft adapted to actuate said fluid control valves, said fluid pressure controlled by said main operating member controlling said change speed gear.

RICHARD LANG.
FRITZ KOCH.